(12) United States Patent
Nakabayashi et al.

(10) Patent No.: US 9,093,192 B2
(45) Date of Patent: Jul. 28, 2015

(54) SILVER-COATED SPHERICAL RESIN, METHOD FOR PRODUCING SAME, ANISOTROPICALLY CONDUCTIVE ADHESIVE CONTAINING SILVER-COATED SPHERICAL RESIN, ANISOTROPICALLY CONDUCTIVE FILM CONTAINING SILVER-COATED SPHERICAL RESIN, AND CONDUCTIVE SPACER CONTAINING SILVER-COATED SPHERICAL RESIN

(75) Inventors: Akira Nakabayashi, Sunto-gun (JP); Shigeharu Sasaki, Yurihonjo (JP); Kazutoshi Yamamoto, Akita (JP); Maki Yamaguchi, Akita (JP)

(73) Assignees: MITSUBISHI MATERIALS CORPORATION, Tokyo (JP); Mitsubishi Materials Electronic Chemicals Co., Ltd., Akita-shi (JP)

( * ) Notice: Subject to any disclaimer, the term of this patent is extended or adjusted under 35 U.S.C. 154(b) by 79 days.

(21) Appl. No.: 13/814,064
(22) PCT Filed: Aug. 17, 2011
(86) PCT No.: PCT/JP2011/068599
§ 371 (c)(1),
(2), (4) Date: Feb. 4, 2013
(87) PCT Pub. No.: WO2012/023566
PCT Pub. Date: Feb. 23, 2012

(65) Prior Publication Data
US 2013/0140501 A1 Jun. 6, 2013

(30) Foreign Application Priority Data
Aug. 20, 2010 (JP) .................. 2010-184861

(51) Int. Cl.
*H01B 1/02* (2006.01)
*C23C 18/16* (2006.01)
(Continued)

(52) U.S. Cl.
CPC .. *H01B 1/12* (2013.01); *C08K 7/14* (2013.01); *C09J 11/00* (2013.01); *C23C 18/1635* (2013.01);
(Continued)

(58) Field of Classification Search
CPC ............ C23C 18/44; C23C 18/31; C09J 9/02; H01B 1/22; H01B 5/00; H01B 5/16; H01B 13/00; H01B 11/01; H01B 1/12
USPC .......................................... 252/514; 427/125
See application file for complete search history.

(56) References Cited

U.S. PATENT DOCUMENTS 6,638,448 B2 * 10/2003 Karttunen et al. ............ 252/512
2003/0236362 A1 * 12/2003 Bluem et al. .................. 525/530
(Continued)

FOREIGN PATENT DOCUMENTS

| JP | 01-225776 A | 9/1989 |
| JP | 01-225778 A | 9/1989 |
| JP | 02-118079 A | 5/1990 |

(Continued)

OTHER PUBLICATIONS

Nakabayashi et al. "Silver-Coated Spherical Resin and Its Production Process". Published May 2, 1990. STIC translation (ASRC) of JP 02-118079A. 16 Total pages.*

(Continued)

*Primary Examiner* — Khanh T Nguyen
*Assistant Examiner* — Danny N Kang
(74) *Attorney, Agent, or Firm* — Locke Lord LLP; James E. Armstrong, IV; Nicholas J. DiCeglie, Jr.

(57) ABSTRACT

This silver-coated spherical resin includes: a spherical resin; and silver coated on a surface of the spherical resin, wherein an amount of the silver is in a range of 2 to 80 parts by mass with respect to 100 parts by mass of the silver-coated spherical resin, and a crystallite diameter of the silver measured by X-ray diffractometry is in a range of 18 to 24 nm. This method for producing a silver-coated spherical resin includes: a process of subjecting a spherical resin to a pretreatment using an aqueous solution of a tin compound; and a subsequent process of subjecting the spherical resin to an electroless silver plating using a reducing agent, wherein, during the pretreatment, a temperature of the aqueous solution of the tin compound is set to be in a range of 20 to 45° C.

10 Claims, 3 Drawing Sheets

(51) Int. Cl.

| | |
|---|---|
| *C23C 18/28* | (2006.01) |
| *C23C 18/44* | (2006.01) |
| *H01B 13/00* | (2006.01) |
| *C09J 11/00* | (2006.01) |
| *C23C 18/24* | (2006.01) |
| *C08K 7/14* | (2006.01) |
| *H01B 1/22* | (2006.01) |
| *H01B 1/12* | (2006.01) |
| *H01R 4/04* | (2006.01) |
| *C09J 9/02* | (2006.01) |
| *C08K 7/16* | (2006.01) |
| *C08K 9/02* | (2006.01) |

(52) U.S. Cl.
CPC ............. *C23C 18/1641* (2013.01); *C23C 18/24* (2013.01); *C23C 18/285* (2013.01); *C23C 18/44* (2013.01); *H01B 1/22* (2013.01); *H01B 13/00* (2013.01); *C08K 7/16* (2013.01); *C08K 9/02* (2013.01); *C09J 9/02* (2013.01); *H01R 4/04* (2013.01)

(56) References Cited

U.S. PATENT DOCUMENTS

| | | |
|---|---|---|
| 2008/0206567 A1 | 8/2008 | Min et al. |
| 2009/0220738 A1* | 9/2009 | Oka et al. ...................... 428/137 |

FOREIGN PATENT DOCUMENTS

| | | | |
|---|---|---|---|
| JP | 02118079 A * | 5/1990 | |
| JP | 08-311655 A | 11/1996 | |
| JP | 11-061424 A | 3/1999 | |
| JP | 2003-208813 A | 7/2003 | |
| JP | 2003208813 A * | 7/2003 | |
| JP | 2004-238730 A | 8/2004 | |
| JP | 2007-242307 A | 9/2007 | |
| JP | 2010-053435 A | 3/2010 | |
| WO | WO-2009/054371 A1 | 4/2009 | |

OTHER PUBLICATIONS

International Search Report dated Sep. 20, 2011, issued for PCT/JP2011/068599 and English translation thereof.
Notice of Allowance mailed Feb. 12, 2014, issued for the Japanese patent application No. 2012-529603 and English translation thereof.
Extended European Search Report issued in corresponding European Patent Application No. EP 11818207.0 dated Nov. 28, 2014.

* cited by examiner

സിൽVER-COATED SPHERICAL RESIN, METHOD FOR PRODUCING SAME, ANISOTROPICALLY CONDUCTIVE ADHESIVE CONTAINING SILVER-COATED SPHERICAL RESIN, ANISOTROPICALLY CONDUCTIVE FILM CONTAINING SILVER-COATED SPHERICAL RESIN, AND CONDUCTIVE SPACER CONTAINING SILVER-COATED SPHERICAL RESIN

TECHNICAL FIELD

The present invention relates to a silver-coated spherical resin which has a low specific gravity and the same conductivity as that of silver, and is cheap. Particularly, the present invention relates to a silver-coated spherical resin which is suitable for a conductive filler contained in an anisotropically conductive adhesive, an anisotropically conductive film, and a conductive spacer, which are used in an electronic display device such as a liquid crystal display.

The present application claims priority on Japanese Patent Application No. 2010-184861 filed on Aug. 20, 2010, the content of which is incorporated herein by reference.

BACKGROUND ART

Hitherto, as a conductive filler for an anisotropically conductive adhesive, an anisotropically conductive film, and a conductive spacer, which are used in an electronic display device such as a liquid crystal display, a conductive filler has been used which is made by coating ceramic powder or resin powder with a metal such as gold, silver, copper, nickel, or the like. Regarding such conductive fillers, Patent Documents 1 and 2 have been reported. In Patent Document 1, a method of producing a conductive filler is disclosed in which fine powder of a metal is subjected to electroless plating while applying ultrasonic waves thereto. In Patent Document 2, a method of producing a silver-coated spherical phenol resin is disclosed in which a spherical phenol resin is activated by an aqueous hydrochloric acid solution of tin chloride and is then subjected to electroless silver plating. However, silver-plated films formed by such methods have problems in denseness and adhesion.

As conductive fillers that improved the problems, Patent Documents 3 to 5 have been reported. In Patent Document 3, a conductive filler is disclosed which is produced by performing nickel plating on inorganic or organic particles to form a base, then performing copper plating thereon, and further performing silver plating thereon. In Patent Document 4, a conductive filler is disclosed which is produced by performing nickel plating on base material particles to form a base, and further performing silver plating thereon. In Patent Document 5, a conductive filler is disclosed which is produced by not performing silver plating but performing nickel plating on resin powder to form a base and further performing gold plating thereon. In a current state, a conductive filler is produced by performing nickel plating on resin powder to form a base and further performing gold plating thereon, and the conductive filler is mainly used for purposes of an anisotropically conductive adhesive, an anisotropically conductive film, and a conductive spacer.

In addition, a method has been reported which includes subjecting a spherical cross-linked polystyrene resin or phenol resin to electroless plating of silver (Patent Document 6). In the electroless plating, a tin coating is formed on the surface of the spherical resin by using a solution of stannous chloride and hydrochloric acid, and then a silver coated film is formed on the tin coating.

However, in all of the production method of performing copper plating and silver plating after nickel base plating (Patent Document 3), the production method of performing silver plating after nickel base plating (Patent Document 4), the production method of performing gold plating after nickel base plating (Patent Document 5) described above, one or two layers of plating need to be further formed after performing the nickel base plating. Therefore, the number of performing plating is increased, and it takes a lot of efforts. In addition, in the case where it is used as a conductive filler for a conductive spacer, characteristics are required such as a way of crushing of a filler when a load is exerted on the filler through a weight and the rate of recovery when the weight is removed. With regard to the conductive particles of Patent Documents 3 to 5, the nickel base plating is hard; and therefore, it is required to improve the characteristics.

In addition, in the method of performing electroless plating of silver on the spherical cross-linked polystyrene resin or phenol resin (Patent Document 6), a pretreatment is performed using a solution of stannous chloride and hydrochloric acid as a tin compound, and then silver plating is performed. In this method, only a silver coated film that is inferior in denseness and adhesion may be formed on the fine particle resin made of an acryl-based resin or styrene-based resin.

On the other hand, regarding the conductive filler for an anisotropically conductive adhesive, an anisotropically conductive film, and a conductive spacer, a practical use of a conductive filler using resin fine particles made of an acryl-based resin or styrene-based resin is required from the viewpoint of a way of crushing of a filler when a load is exerted on the filler through a weight and the rate of recovery when the weight is removed.

PRIOR ART DOCUMENT

Patent Document

Patent Document 1: Japanese Unexamined Patent Application, First Publication No. H01-225778
Patent Document 2: Japanese Unexamined Patent Application, First Publication No. H01-225776
Patent Document 3: Japanese Unexamined Patent Application, First Publication No. H11-61424
Patent Document 4: Japanese Unexamined Patent Application, First Publication No. 2007-242307
Patent Document 5: Japanese Unexamined Patent Application, First Publication No. H08-311655
Patent Document 6: Japanese Unexamined Patent Application, First Publication No. H02-118079

DISCLOSURE OF THE INVENTION

Problems to be Solved by the Invention

The present invention aims to provide a silver-coated spherical resin (conductive filler) having an appropriate way of crushing of a filler and a recovery rate and having excellent conductivity. In addition, the present invention further aims to provide a method for producing a silver-coated spherical resin capable of directly coating resin fine particles made of an acryl-based resin or styrene resin with silver without performing base plating; and thereby, a plating treatment is simplified.

Means for Solving the Problems

The inventors coated various carriers with silver using an electroless plating method; and thereby, they have developed a conductive filler for an anisotropically conductive adhesive, an anisotropically conductive film, and a conductive spacer, which are used in an electronic display device such as a liquid crystal display. In addition, tests were repeated to solve the problems described above in Background Art. As a result, the present invention was completed through discovering the following points.

In a pretreatment using a general electroless silver plating method, appropriate tin layers were not able to be formed on resin fine particles of an acryl-based resin or styrene-based resin. Therefore, even in the case where silver plating was performed on the tin layers, silver-plated layers having good adhesion could not be obtained. However, by adjusting the temperature during a tin treatment to be in a range of 20° C. or higher to 45° C. or lower, and preferably in a range of 20 to 35° C., silver plating properties are thereafter enhanced. Therefore, a silver-coated spherical resin is obtained which includes a silver-coated layer having excellent denseness and adhesion.

The features of a silver-coated spherical resin, a method for producing the same, and an anisotropically conductive adhesive, an anisotropically conductive film, and a conductive spacer which contain the silver-coated spherical resin, according to an aspect of the present invention are described as follows.

(1) A silver-coated spherical resin including: a spherical resin; a tin adsorption layer provided on a surface of the spherical resin; and silver coated on a surface of the tin adsorption layer, wherein an amount of the silver is in a range of 2 to 80 parts by mass with respect to 100 parts by mass of the silver-coated spherical resin, and a crystallite diameter of the silver measured by X-ray diffractometry is in a range of 18 to 24 nm.

(2) The silver-coated spherical resin described in (1), wherein the spherical resin resin consists of an acryl-based resin or a styrene-based resin.

(3) The silver-coated spherical resin described in (1) or (2), wherein an average particle diameter of the spherical resin is in a range of 0.5 to 40 μm, and a variation coefficient of particle diameters thereof is in a range of 5.0% or less.

(4) The silver-coated spherical resin described in any of (1) to (3), wherein, when a single particle of the silver-coated spherical resin is compressed by 20% of the particle diameter thereof in one direction, a resistance in a compression direction thereof is in a range of 100Ω or lower.

(5) The silver-coated spherical resin described in any of (1) to (4), wherein, when a single particle of the silver-coated spherical resin is compressed by 50% of the particle diameter thereof in one direction, a resistance in a compression direction thereof is in a range of 10Ω or lower.

(6) A method for producing a silver-coated spherical resin including: a process of subjecting a spherical resin to a pretreatment using an aqueous solution of a tin compound; and a subsequent process of subjecting the spherical resin to an electroless silver plating using a reducing agent, wherein, during the pretreatment, a temperature of the aqueous solution of the tin compound is set to be in a range of 20 to 45° C.

(7) The method for producing a silver-coated spherical resin described in (6), wherein the reducing agent includes formaldehyde.

(8) The method for producing a silver-coated spherical resin described in (7), wherein the reducing agent further includes glucose.

(9) An anisotropically conductive adhesive including the silver-coated spherical resin described in any of (1) to (5).

(10) An anisotropically conductive film including the silver-coated spherical resin described in any of (1) to (5).

(11) A conductive spacer including the silver-coated spherical resin described in any of (1) to (5).

Effects of the Invention

According to the aspect of the present invention described in (1), even though a spherical resin having a low specific gravity is used, the silver-coated spherical resin can be provided which has excellent conductivity and excellent adhesion between the spherical resin and silver and which is appropriate for a conductive filler. In addition, according to the aspect of the present invention described in (2), from the viewpoint of a way of crushing of a filler when a load is exerted on the filler through a weight and the rate of recovery when the weight is removed, the silver-coated spherical resin can be provided which satisfies characteristic values particularly required for an anisotropically conductive adhesive, an anisotropically conductive film, and a conductive.

According to the aspect of the present invention described in (6), the silver-coated spherical resin can be easily produced which has excellent conductivity and excellent adhesion between the spherical resin and silver and which is appropriate for a conductive filler.

BEST MODE FOR CARRYING OUT THE INVENTION

Hereinafter, the present invention will be described in detail on the basis of embodiments. In addition, "%" is mass % if not particularly indicated except for a case of a unique numerical value.

[Silver-Coated Spherical Resin]

A silver-coated spherical resin (silver-coated spherical resin particles) of the present embodiment includes a spherical resin (spherical resin particles), a tin adsorption layer provided on the surface of the spherical resin, and silver (silver-coated layer) that is coated on the surface of the tin adsorption layer. The content of silver is in a range of 2 to 80 parts by mass with respect to 100 parts by mass of the silver-coated spherical resin. The crystallite diameter of silver measured by X-ray diffractometry is in a range of 18 to 24 nm.

The spherical resin may be substantially spherical particles, and examples thereof include completely spherical particles, particles having a shape close to a spherical shape such as an ellipse, and particles having slight unevenness on the surface. It is preferable that the shape of the spherical resin be closer to a spherical shape. In the case where the shape of the spherical resin has a sharp projecting piece, there may be cases where adhesion of a plated coating is harmed or dispersability is deteriorated. In addition, this may become a cause that harms reproducibility of conductivity exertion when the silver-coated spherical resin is used as a conductive filler. Therefore, a shape having the sharp projecting piece is not preferable. The ratio of the long diameter to the short diameter of the particles of the spherical resin is preferably in a range of 1 to 1.5, more preferably in a range of 1 to 1.3, and most preferably in a range of 1 to 1.1.

From the viewpoint of characteristics (a way of crushing of a filler when a load is exerted on the filler through a weight and the rate of recovery when the weight is removed) required when the silver-coated spherical resin is used as an anisotropically conductive adhesive, an anisotropically conductive film, or the like, it is preferable that the spherical resin consists of an acryl-based resin or a styrene-based resin. A methyl methacrylate resin (PMMA resin) or the like may be employed as the acryl-based resin. A polystyrene resin (PS resin) or the like may be employed as the styrene-based resin.

It is preferable that the average particle diameter of the spherical resin is in a range of 0.5 to 40 μm. It is preferable that the variation coefficient of the particle diameter of the spherical resin is in a range of 5.0% or less and the particle diameters are uniform. In the case where the average particle diameter of the spherical resin is smaller than 0.5 μm, the surface area of the spherical resin is large; and therefore, a larger content of silver is required to obtain conductivity needed for a conductive filler. In the case where the average particle diameter of the spherical resin is larger than 40 μm, it is difficult for the silver-coated spherical resin to be applied to a fine pattern. In addition, in the case where the particle diameters are not uniform, this may be a cause that harms reproducibility of conductivity exertion in use as a conductive filler. Therefore, it is more preferable that the variation coefficient of the particle diameter of the silver-coated spherical resin is in a range of 6.0% or less and the particle diameters are uniform.

Here, the average particle diameter is obtained by the following method. Using a scanning electron microscope (product number: SU-1500) manufactured by Hitachi High-Technologies Corporation, diameters of 300 spherical resin particles are measured at a 2000-fold magnification by software (product name: PC SEM). In addition, an average particle diameter is obtained by calculating the average value of the measured values. The variation coefficient (CV value, unit: %) is obtained from the particle diameters of the 300 spherical particles by an expression: [(standard deviation/average particle size)×100].

A tin adsorption layer is provided on the surface of the spherical resin. The tin adsorption layer contains divalent ions of tin in a tin compound used in a pretreatment described later. In the pretreatment, the divalent ions of tin adhere to the surface of the spherical resin; and thereby, the tin adsorption layer is formed.

In general, when electroless plating is performed on the surface of a nonconductor such as an organic material or an inorganic material, it is necessary to perform a catalyzation treatment on the surface of the nonconductor in advance. In the present embodiment, since the tin adsorption layer is provided on the surface of the spherical resin by performing the catalyzation treatment (pretreatment), the electroless plating described layer can be performed; and thereby, silver (silver-coated layer) having the following characteristics is formed.

The crystallite diameter of silver is the average value of the crystallite diameters of the (111) crystal face, the (200) crystal face, and the (220) crystal face, and the (311) crystal face obtained by the Debye-Scherrer method of X-ray diffraction by CuKα radiation. In the case where the crystallite diameter of silver is smaller than 18 nm, aggregation of crystal particles of silver occurs; and thereby, a dense silver coated film is not obtained and adhesion of silver to the spherical resin is degraded. In the case where the crystallite diameter of silver is larger than 24 nm, the crystal particles of silver are coarsened; and thereby, a dense silver coated film is not obtained and adhesion of silver to the spherical resin is degraded.

The coated amount (content) of silver is determined depending on the average particle diameter of the resin and desired conductivity. In the case where the content of silver is less than 2 parts by mass with respect to 100 parts by mass of silver-coated spherical resin, it is difficult to obtain contact points between silver when the silver-coated spherical resin is dispersed as the conductive filler and sufficient conductivity may not be provided. On the other hand, in the case where the content of silver is more than 80 parts by mass, the specific gravity is increased, and conductivity is saturated even though cost is increased.

Regarding the conductivity of the silver-coated spherical resin of the present embodiment, the powder volume resistance is preferably in a range of $1 \times 10^{-2}$ Ω·cm or lower, and more preferably in a range of $3 \times 10^{-3}$ Ω·cm or lower. In the case where the powder volume resistance is higher than $1 \times 10^{-2}$ Ω·cm, the resistance is high, which is inappropriate for a conductive material. Here, the powder volume resistance is a value measured by the following method. Sample powder (the silver-coated spherical resin) is put in a pressure vessel and is compressed at a pressure of 9.8 MPa to obtain a compact, and the resistance of the compact is measured by a digital multimeter.

Figure 1:
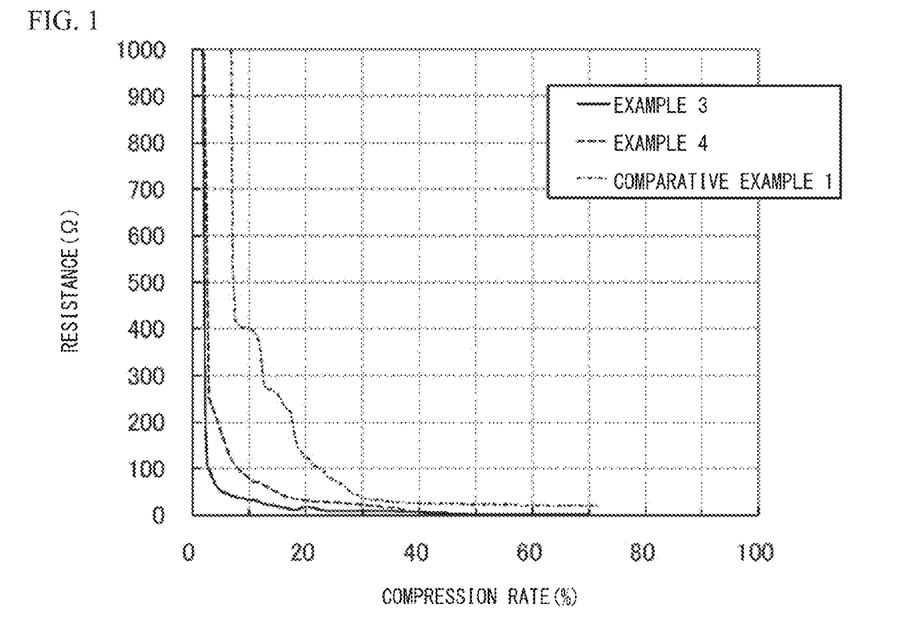
FIG. 1 is a diagram showing an example of the relationship between a compression rate (horizontal axis) and a resistance (vertical axis) obtained by performing a compression test on a single particle of each of silver-coated spherical resins of Example 3, Example 4, and Comparative Example 1.

In addition, when a single particle of the silver-coated spherical resin is compressed by 20% of the particle diameter thereof in one direction, it is preferable that the resistance in the compression direction is in a range of 100Ω or lower. While a single particle of a silver-coated spherical resin in each of Example 3 (particle diameter: 20 μm), Example 4 (particle diameter: 7 μm), and Comparative Example 1 (particle diameter: 7 μm) was compressed in the one direction by a minute compression tester with an electric resistance measuring device (product number: MCTM-200) made by Shimadzu Corporation, the resistance thereof was measured (compression test). FIG. 1 shows an example of the relationship between the measured compression rate (horizontal axis, unit: %) and the resistance (vertical axis, unit: Ω). As can be seen from FIG. 1, the resistance is reduced as the compression rate is increased, and in both of Examples 3 and 4 according to the present embodiment, the resistivity at a compression rate of 20% is in a range of 100Ω or lower. On the other hand, in Comparative Example 1 obtained by performing nickel/gold plating on acryl resin powder, the resistivity at a compression rate of 20% is 122Ω, and the resistivity at a compression rate of about 23% is 100 Ω.

Figure 2:
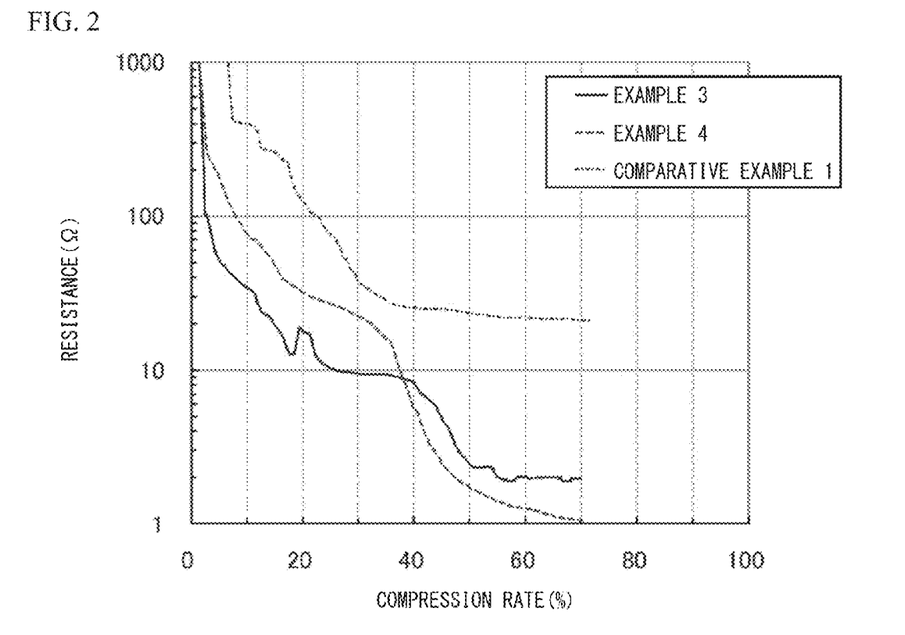
FIG. 2 is a diagram that expresses the resistance (vertical axis) of FIG. 1 by logarithm.

In addition, when a single particle of the silver-coated spherical resin is compressed by 50% of the particle diameter thereof in one direction, it is preferable that the resistance of the compression direction is in a range of 10Ω or lower. FIG. 2 shows a diagram that expresses the resistance (vertical axis) of FIG. 1 by logarithm. As can be seen from FIG. 2, the resistance at a compression rate of 50% in both of Examples 3 and 4 is in a range of 10Ω or lower. On the other hand, in Comparative Example 1, the resistance at a compression rate of 50% is about 24Ω, and the resistance at a compression rate of 70% is about 21 Ω.

The silver-coated spherical resin of the present embodiment is excellent as the conductive filler, and particularly, may be optimally applied to an anisotropically conductive adhesive, an anisotropically conductive film, and a conductive spacer.

[Anisotropically Conductive Adhesive, Anisotropically Conductive Film, and Conductive Spacer]

An anisotropically conductive adhesive and an anisotropically conductive film contain an insulating binder resin and conductive fine particles dispersed in the insulating binder resin. In the present embodiment, as the conductive fine particles, the silver-coated spherical resin of the present embodiment is contained. The content of the silver-coated spherical resin is not particularly limited but appropriately determined depending on the purpose, and a content of about 0.5% to 5% is preferable.

As the anisotropically conductive adhesive, for example, an anisotropically conductive paste, an anisotropically conductive ink, or the like may be employed. In the present embodiment, as the conductive fine particles, the silver-coated spherical resin of the present embodiment is contained. In the case of the anisotropically conductive adhesive, the insulating binder resin is not particularly limited, and for example, a composition that is cured by heat or light such as a thermosetting resin or a curable resin composition, or the like may be employed. As the thermosetting resin, a styrene-butadiene block copolymer, an acrylate resin, an ethylene-vinyl acetate resin, or the like may be employed. As the curable resin composition, a resin composition that contains a monomer or oligomer having a glycidyl group, and a curing agent such as isocyanate or the like may be employed.

The anisotropically conductive film is an anisotropically conductive film formed in a film form and is produced by, for example, the following method. A composition is produced in which conductive fine particles are dispersed in an insulating binder resin, and the composition is coated on the surface of a support film such as PET or the like. Thereby, the anisotropically conductive film is obtained. In the case of the anisotropically conductive film, the insulating binder resin is a resin composition that includes a thermosetting resin such as an epoxy resin or a phenoxy resin as a main component.

The conductive spacer includes the silver-coated spherical resin of the present embodiment. The conductive spacer electrically and vertically connects wiring parts of two of upper and lower substrates having a liquid crystal material interposed therebetween, and holds the gap between the substrates in predetermined dimensions in a liquid crystal display apparatus. For example, a resin composition is produced by adding the conductive spacer to a thermosetting resin, a UV light curing adhesive, or the like. Then, the resin composition is coated on the wiring parts of the two of upper and lower substrates, and the two substrates are bonded to each other. The content of the conductive spacer (the silver-coated spherical resin) in the resin composition is not particularly limited but appropriately determined depending on the purpose, and a content of about 2% to 10% is preferable.

[Method for Producing Silver-Coated Spherical Resin]

A method for producing the silver-coated spherical resin of the present embodiment includes a process of subjecting the spherical resin to a pretreatment using an aqueous solution of a tin compound (a process of forming the tin adsorption layer), and a subsequent process of subjecting the pretreated spherical resin to an electroless silver plating using a reducing agent (a process of forming a silver-coated layer). The temperature of the aqueous solution of the tin compound is set to be in a range of 20 to 45° C.

<<Pretreatment>>

In the pretreatment, for example, the spherical resin is added to the aqueous solution of the tin compound and is agitated. Then, the spherical resin is filtered and washed with water. The agitation time is appropriately determined depending on the temperature of the aqueous solution of the tin compound and the content of the tin compound as follows, and the agitation time is preferably in a range of 0.5 to 24 hours.

The temperature of the aqueous solution of the tin compound is in a range of 20 to 45° C., preferably in a range of 20 to 35° C., more preferably in a range of 25 to 35° C., and most preferably in a range of 27 to 35° C. In the case where the temperature of the aqueous solution of the tin compound is lower than 20° C., the activity of the aqueous solution is lowered due to the temperature decrease, and the tin compound does not sufficiently adhere to the spherical resin. On the other hand, even in the case where the temperature of the aqueous solution of the tin compound is higher than 45° C., the tin compound is oxidized, and the aqueous solution becomes unstable. Therefore, the tin compound does not sufficiently adhere to the spherical resin. By performing the pretreatment in the aqueous solution at a temperature of 20 to 45° C., crystal particles of silver having appropriate crystallite diameters can be precipitated even on fine particles made of an acryl-based resin or a styrene-based resin which has poor adhesion in a method in the related art. Therefore, a silver-plated layer (silver-coated layer) having excellent adhesion and denseness can be formed. Moreover, since the silver-plated layer has excellent adhesion and denseness, the resistance in the compression direction when the particle diameter is compressed by 10% in one direction can be reduced to one tenth of that of a product of the related art.

As the tin compound used in the pretreatment, stannous chloride, stannous fluoride, stannous bromide, stannous iodide, or the like may be employed. In the case where stannous chloride is used, it is preferable that the content of stannous chloride in the aqueous solution of the tin compound is in a range of 30 to 100 g/dm$^3$. In the case where the content of the stannous chloride is in a range of 30 g/dm$^3$ or higher, it is easy to form a uniform tin layer (tin adsorption layer). In addition, in the case where the content of the stannous chloride is in a range of 100 g/dm$^3$ or lower, it is easy to suppress the amount of inevitable impurities in the stannous chloride. In addition, the stannous chloride can be contained in the aqueous solution of the tin compound until the stannous chloride is saturated.

It is preferable that the aqueous solution of the tin compound contains 0.5 to 2 cm$^3$ of hydrochloric acid with respect to 1 g of the stannous chloride. In the case where the amount of hydrochloric acid is in a range of 0.5 cm$^3$ or higher, the solubility of the stannous chloride is enhanced, and hydrolysis of tin can be suppressed. In the case where the amount of hydrochloric acid is in a range of 2 cm$^3$ or lower, the pH of the aqueous solution of the tin compound does not become too low; and thereby, the tin can be efficiently adsorbed onto the spherical resin.

<<Electroless Silver Plating>>

As the electroless plating, the following methods may be employed, and any of the methods may be applied:

(1) a method in which a spherical resin subjected to a pretreatment is immersed in an aqueous solution including a complexing agent, a reducing agent, and the like, and an aqueous silver salt solution is dropped, (2) a method in which a spherical resin subjected to a pretreatment is immersed in an aqueous solution including a silver salt and a complexing agent, and an aqueous reducing agent solution is dropped, and (3) a method in which a spherical resin subjected to a pretreatment is immersed in an aqueous solution including a silver salt, a complexing agent, a reducing agent, and the like, and an aqueous caustic alkali solution is dropped.

As the silver salt, silver nitrate, one obtained by dissolving silver in nitric acid, or the like may be used. As the complexing agent, salts such as ammonia, ethylenediaminetetraacetic acid, ethylenediaminetetraacetic acid tetrasodium, nitrotriacetic acid, and triethylenetetramine hexaacetic acid may be used. As the reducing agent, formalin, glucose, Rochelle salt (sodium potassium tartrate), hydrazine, derivatives thereof, and the like may be used. As the reducing agent, formaldehyde is preferable, a mixture of two or more kinds of reducing agents including at least formaldehyde is more preferable, and a mixture of reducing agents including formaldehyde and glucose is most preferable.

EXAMPLES

Hereinafter, the present invention will be described in detail using Examples, and the present invention is not limited thereto.

Example 1

Pretreatment 15 g of stannous chloride and 15 cm$^3$ of 35% hydrochloric acid were diluted with water to obtain a 1 dm$^3$ of solution using a measuring flask having a capacity of 1 dm$^3$ and the solution was kept at 25° C. 50 g of an acryl resin (spherical resin) having an average particle diameter of 35 μm and a variation coefficient of particle diameters of 2.1% was added to the aqueous solution and was agitated for 1 hour. Thereafter, the spherical resin was filtered and washed with water. The pretreatment was performed in this manner.
<<Electroless Silver Plating>>
10.7 g of ethylenediaminetetraacetic acid tetrasodium (complexing agent), 2.5 g of sodium hydroxide, and 5 cm$^3$ of formalin (reducing agent) were dissolved in 2 dm$^3$ of water; and thereby, an aqueous solution including the complexing agent and the reducing agent was produced. In addition, 1.7 g of silver nitrate, 2 cm$^3$ of 25% ammonia water, and 10 cm$^3$ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 2% silver; and thereby, a silver-coated spherical resin was produced. Thereafter, the silver-coated spherical resin was washed with water and dried. Accordingly, the silver-coated spherical resin of Example 1 was obtained.

Example 2

Pretreatment 15 g of stannous chloride and 15 cm$^3$ of 35% hydrochloric acid were diluted with water to obtain a 1 dm$^3$ of solution a measuring flask having a capacity of 1 dm$^3$ and the solution was kept at 27° C. 50 g of an acryl resin (spherical resin) having an average particle diameter of 30 μM and a variation coefficient of particle diameters of 2.6% was added to the aqueous solution and was agitated for 0.5 hours. Thereafter, the spherical resin was filtered and washed with water. The pretreatment was performed in this manner.
<<Electroless Silver Plating>>
58.5 g of ethylenediaminetetraacetic acid tetrasodium (complexing agent), 13.5 g of sodium hydroxide, and 30 cm$^3$ of formalin (reducing agent) were dissolved in 2 dm$^3$ of water; and thereby, an aqueous solution including the complexing agent and the reducing agent was produced. In addition, 9.0 g of silver nitrate, 12 cm$^3$ of 25% ammonia water, and 50 cm$^3$ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 10% silver; and thereby, a silver-coated spherical resin was produced. Thereafter, the silver-coated spherical resin was washed with water and dried. Accordingly, the silver-coated spherical resin of Example 2 was obtained.

Example 3

Pretreatment 20 g of stannous chloride and 20 cm$^3$ of 35% hydrochloric acid were diluted with water to obtain a 1 dm$^3$ of solution using a measuring flask having a capacity of 1 dm$^3$ and the solution was kept at 30° C. 50 g of an acryl resin (spherical resin) having an average particle diameter of 20 μm and a variation coefficient of particle diameters of 3.2% was added to the aqueous solution and was agitated for 1.5 hours. Thereafter, the spherical resin was filtered and washed with water. The pretreatment was performed in this manner.
<<Electroless Silver Plating>>
130 g of ethylenediaminetetraacetic acid tetrasodium (complexing agent), 30 g of sodium hydroxide, and 60 cm$^3$ of formalin (reducing agent) were dissolved in 2 dm$^3$ of water; and thereby, an aqueous solution including the complexing agent and the reducing agent was produced. In addition, 20 g of silver nitrate, 30 cm$^3$ of 25% ammonia water, and 100 cm$^3$ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 20% silver; and thereby, a silver-coated spherical resin was produced. Thereafter, the silver-coated spherical resin was washed with water and dried. Accordingly, the silver-coated spherical resin of Example 3 was obtained.

Example 4

Pretreatment 20 g of stannous chloride and 20 cm$^3$ of 35% hydrochloric acid were diluted with water to obtain a 1 dm$^3$ of solution using a measuring flask having a capacity of 1 dm$^3$ and the solution was kept at 35° C. 50 g of an acryl resin (spherical resin) having an average particle diameter of 7 μm and a variation coefficient of particle diameters of 4.5% was added to the aqueous solution and was agitated for 2 hours. Thereafter, the spherical resin was filtered and washed with water. The pretreatment was performed in this manner.

<<Electroless Silver Plating>>

280 g of ethylenediaminetetraacetic acid tetrasodium (complexing agent), 65 g of sodium hydroxide, and 130 cm$^3$ of formalin (reducing agent) were dissolved in 2 dm$^3$ of water; and thereby, an aqueous solution including the complexing agent and the reducing agent was produced. In addition, 43.0 g of silver nitrate, 55 cm$^3$ of 25% ammonia water, and 215 cm$^3$ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 35% silver; and thereby, a silver-coated spherical resin was produced. Thereafter, the silver-coated spherical resin was washed with water and dried. Accordingly, the silver-coated spherical resin of Example 4 was obtained.

Example 5

Pretreatment 20 g of stannous chloride and 20 cm$^3$ of 35% hydrochloric acid were diluted with water to obtain a 1 dm$^3$ of solution using a measuring flask having a capacity of 1 dm$^3$ and the solution was kept at 30° C. 50 g of an acryl resin (spherical resin) having an average particle diameter of 3 μm and a variation coefficient of particle diameters of 2.8% was added to the aqueous solution and was agitated for 2 hours. Thereafter, the spherical resin was filtered and washed with water. The pretreatment was performed in this manner.

<<Electroless Silver Plating>>

520 g of ethylenediaminetetraacetic acid tetrasodium (complexing agent), 120 g of sodium hydroxide, and 240 cm$^3$ of formalin (reducing agent) were dissolved in 2 dm$^3$ of water; and thereby, an aqueous solution including the complexing agent and the reducing agent was produced. In addition, 78.8 g of silver nitrate, 100 cm$^3$ of 25% ammonia water, and 400 cm$^3$ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped to coat the acryl resin with 50% silver; and thereby, a silver-coated spherical resin was produced. Thereafter, the silver-coated spherical resin was washed with water and dried. Accordingly, the silver-coated spherical resin of Example 5 was obtained.

Example 6

Pretreatment 20 g of stannous chloride and 20 cm$^3$ of 35% hydrochloric acid were diluted with water to obtain a 1 dm$^3$ of solution using a measuring flask having a capacity of 1 dm$^3$ and the solution was kept at 25° C. 10 g of an acryl resin (spherical resin) having an average particle diameter of 1 μm and a variation coefficient of particle diameters of 3.8% was added to the aqueous solution and was agitated for 2 hours. Thereafter, the spherical resin was filtered and washed with water. The pretreatment was performed in this manner.

<<Electroless Silver Plating>>

416 g of ethylenediaminetetraacetic acid tetrasodium (complexing agent), 96 g of sodium hydroxide, and 192 cm$^3$ of formalin (reducing agent) were dissolved in 2 dm$^3$ of water; and thereby, an aqueous solution including the complexing agent and the reducing agent was produced. In addition, 63.0 g of silver nitrate, 80 cm$^3$ of 25% ammonia water, and 320 cm$^3$ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 80% silver; and thereby, a silver-coated spherical resin was produced. Thereafter, the silver-coated spherical resin was washed with water and dried. Accordingly, the silver-coated spherical resin of Example 6 was obtained.

Example 7

Pretreatment 20 g of stannous chloride and 20 cm$^3$ of 35% hydrochloric acid were diluted with water to obtain a 1 dm$^3$ of solution using a measuring flask having a capacity of 1 dm$^3$ and the solution was kept at 20° C. 10 g of an acryl resin (spherical resin) having an average particle diameter of 1 μm and a variation coefficient of particle diameters of 3.8% was added to the aqueous solution and was agitated for 2 hours. Thereafter, the spherical resin was filtered and washed with water. The pretreatment was performed in this manner.

<<Electroless Silver Plating>>

416 g of ethylenediaminetetraacetic acid tetrasodium (complexing agent), 96 g of sodium hydroxide, and 192 cm$^3$ of formalin (reducing agent) were dissolved in 2 dm$^3$ of water; and thereby, an aqueous solution including the complexing agent and the reducing agent was produced. In addition, 63.0 g of silver nitrate, 80 cm$^3$ of 25% ammonia water, and 320 cm$^3$ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 80% silver; and thereby, a silver-coated spherical resin was produced. Thereafter, the silver-coated spherical resin was washed with water and dried. Accordingly, the silver-coated spherical resin of Example 7 was obtained.

Example 8

Pretreatment 20 g of stannous chloride and 20 cm$^3$ of 35% hydrochloric acid were diluted with water to obtain a 1 dm$^3$ of solution using a measuring flask having a capacity of 1 dm$^3$ and the solution was kept at 45° C. 50 g of an acryl resin (spherical resin) having an average particle diameter of 3 μm and a variation coefficient of particle diameters of 2.8% was added to the aqueous solution and was agitated for 2 hours. Thereafter, the spherical resin was filtered and washed with water. The pretreatment was performed in this manner.

<<Electroless Silver Plating>>

520 g of ethylenediaminetetraacetic acid tetrasodium (complexing agent), 120 g of sodium hydroxide, and 240 cm$^3$ of formalin (reducing agent) were dissolved in 2 dm³ of water; and thereby, an aqueous solution including the complexing agent and the reducing agent was produced. In addition, 78.8 g of silver nitrate, 100 cm³ of 25% ammonia water, and 400 cm³ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 50% silver; and thereby, a silver-coated spherical resin was produced. Thereafter, the silver-coated spherical resin was washed with water and dried. Accordingly, the silver-coated spherical resin of Example 8 was obtained.

Example 9

Pretreatment 20 g of stannous chloride and 20 cm³ of 35% hydrochloric acid were diluted with water to obtain a 1 dm³ of solution using a measuring flask having a capacity of 1 dm³ and the solution was kept at 35° C. 50 g of an acryl resin (spherical resin) having an average particle diameter of 7 μm and a variation coefficient of particle diameters of 4.5% was added to the aqueous solution and was agitated for 2 hours. Thereafter, the spherical resin was filtered and washed with water. The pretreatment was performed in this manner.
<<Electroless Silver Plating>>

280 g of ethylenediaminetetraacetic acid tetrasodium (complexing agent), 65 g of sodium hydroxide, and 65 cm³ of formalin (reducing agent) and 82 g of glucose (reducing agent) were dissolved in 2 dm³ of water; and thereby, an aqueous solution including the complexing agent and the reducing agent was produced. In addition, 43.0 g of silver nitrate, 55 cm³ of 25% ammonia water, and 215 cm³ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 35% silver; and thereby, a silver-coated spherical resin was produced. Thereafter, the silver-coated spherical resin was washed with water and dried. Accordingly, the silver-coated spherical resin of Example 9 was obtained.

Comparative Example 1

A plating treatment was performed on 50 g of an acryl resin (spherical resin) having an average particle diameter of 7 μm and a variation coefficient of particle diameters of 4.5%. Accordingly, conductive particles of Comparative Example 1 including a nickel layer with a thickness of 0.08 μm and a gold layer with a thickness of 0.03 μm were obtained.

Comparative Example 2

A plating treatment was performed on 50 g of an acryl resin (spherical resin) having an average particle diameter of 3 μm and a variation coefficient of particle diameters of 2.8%. Accordingly, conductive particles of Comparative Example 2 including a nickel layer with a thickness of 0.075 μm and a gold layer with a thickness of 0.03 μm were obtained.

Comparative Example 3

Pretreatment 20 g of stannous chloride and 20 cm³ of 35% hydrochloric acid were diluted with water to obtain a 1 dm³ of solution using a measuring flask having a capacity of 1 dm³ and the solution was kept at 15° C. 50 g of an acryl resin (spherical resin) having an average particle diameter of 3 μm and a variation coefficient of particle diameters of 2.8% was added to the aqueous solution and was agitated for 2 hours. Thereafter, the spherical resin was filtered and washed with water. The pretreatment was performed in this manner.
<<Electroless Silver Plating>>

520 g of ethylenediaminetetraacetic acid tetrasodium (complexing agent), 120 g of sodium hydroxide, and 240 cm³ of formalin (reducing agent) were dissolved in 2 dm³ of water; and thereby, an aqueous solution including the complexing agent and the reducing agent was produced. In addition, 78.8 g of silver nitrate, 100 cm³ of 25% ammonia water, and 400 cm³ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 50% silver; and thereby, a silver-coated spherical resin was produced. Thereafter, the silver-coated spherical resin was washed with water and dried. Accordingly, the silver-coated spherical resin of Comparative Example 3 was obtained.

Comparative Example 4

Pretreatment 15 g of stannous chloride and 15 cm³ of 35% hydrochloric acid were diluted with water to obtain a 1 dm³ of solution using a measuring flask having a capacity of 1 dm³ and the solution was kept at 50° C. 50 g of an acryl resin (spherical resin) having an average particle diameter of 30 μm and a variation coefficient of particle diameters of 2.6% was added to the aqueous solution and was agitated for 0.5 hours. Thereafter, the spherical resin was filtered and washed with water. The pretreatment was performed in this manner.
<<Electroless Silver Plating>>

58.5 g of ethylenediaminetetraacetic acid tetrasodium (complexing agent), 13.5 g of sodium hydroxide, and 30 cm³ of formalin (reducing agent) were dissolved in 2 dm³ of water; and thereby, an aqueous solution including the complexing agent and the reducing agent was produced. In addition, 9.0 g of silver nitrate, 12 cm³ of 25% ammonia water, and 50 cm³ of water were mixed; and thereby, an aqueous solution including silver nitrate was produced.

The acryl resin (spherical resin) subjected to the pretreatment was immersed into the aqueous solution including the complexing agent and the reducing agent. Thereafter, while agitating the aqueous solution, the aqueous solution including silver nitrate was dropped so as to coat the acryl resin with 10% silver; and thereby, a silver-coated spherical resin was produced. Thereafter, the silver-coated spherical resin was washed with water and dried. Accordingly, under the same conditions as those of Example 2 except that the temperature of the aqueous solution of the tin compound in the pretreatment was 50° C., the silver-coated spherical resin of Comparative Example 4 was obtained.

[Evaluation of Shapes and the like of Particles]

The average particle diameter of the acryl particles (spherical resin) of the raw material was obtained by the following method. Using the scanning electron microscope (product number: SU-1500) manufactured by Hitachi High-Technologies Corporation, diameters of 300 spherical resin particles were measured at a 2000-fold magnification by software (product name: PC SEM). In addition, an average particle diameter was obtained by calculating the average value of the measured values. The variation coefficient (CV value, unit: %) of the particle diameters was obtained from the particle diameters of the 300 spherical particles by an expression: [(standard deviation/average particle size)×100]. Similarly, the variation coefficient of the particle diameters of the produced silver-coated spherical resin was obtained.

The external appearance of the silver-coated spherical resin was observed by the scanning electron microscope. Particles coated with silver plating were evaluated as "A (good)", particles having low coating rates although being coated with silver plating were evaluated as "B (fair)", and particles not coated with silver plating were evaluated as "C (bad)".

Figure 3:
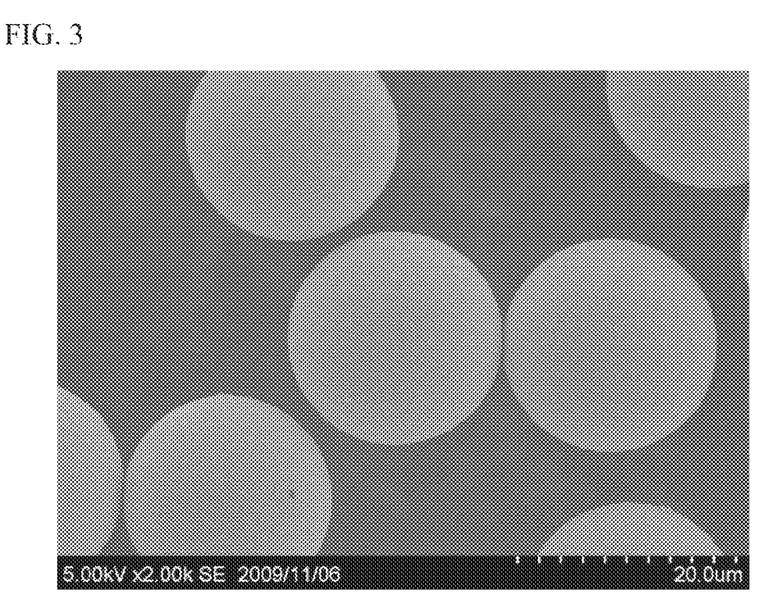
FIG. 3 shows a scanning electron micrograph of the silver-coated spherical resin of Example 3.
Figure 4:
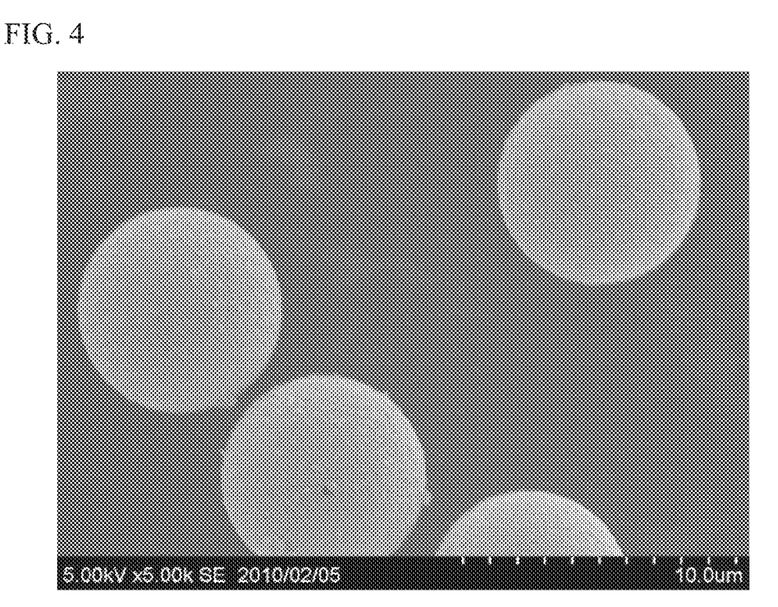
FIG. 4 shows a scanning electron micrograph of Example 4.
Figure 5:
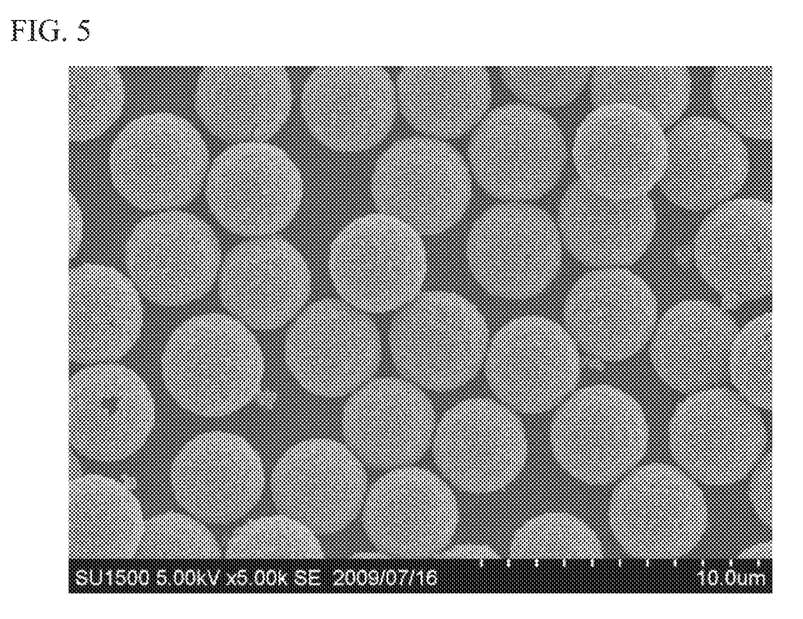
FIG. 5 shows a scanning electron micrograph of Example 8.
Figure 6:
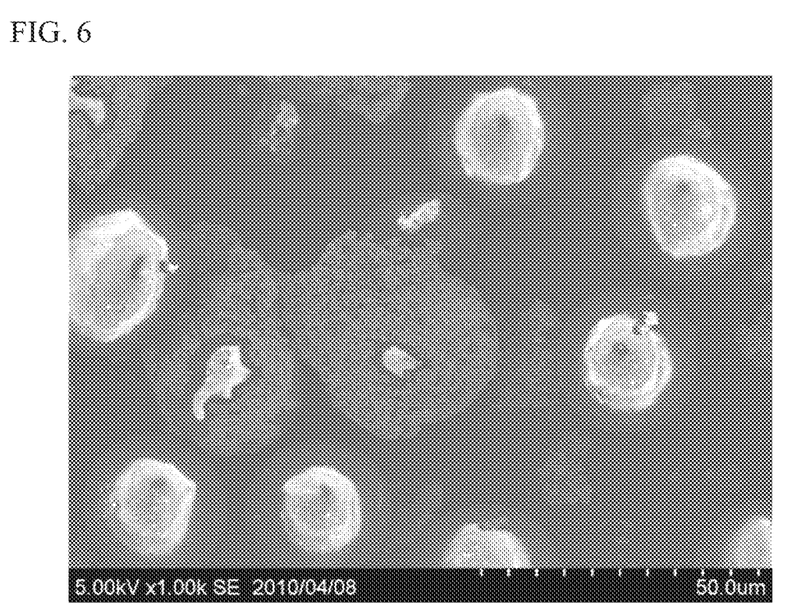
FIG. 6 shows a scanning electron micrograph of Comparative Example 4.

The results are shown in Table 1. FIG. 3 shows a scanning electron micrograph of the silver-coated spherical resin of Example 3. FIG. 4 shows a scanning electron micrograph of Example 4. FIG. 5 shows a scanning electron micrograph of Example 8. FIG. 6 shows a scanning electron micrograph of Comparative Example 4. In addition, the average particle diameter of the silver-coated spherical resin of Example 1 was 35.1 μm. The average particle diameter of the silver-coated spherical resin of Example 2 was 30.3 μm. The average particle diameter of the silver-coated spherical resin of Example 3 was 20.3 μm.

[Measurement of Resistance during Compression of Single Particle of Silver-Coated Spherical Resin]

While a single particle of the silver-coated spherical resin was compressed in the vertical direction by the minute compression tester with an electric resistance measuring device (product number: MCTM-200) manufactured by Shimadzu Corporation, the resistance thereof in the compression direction was measured. Accordingly, the resistance in the compression direction of the single particle of the silver-coated spherical resin when being compressed in one direction was measured.

FIG. 1 shows the relationship between the compression rate (horizontal axis, unit: %) and the resistance (vertical axis, unit: Ω) of each one particle of Example 3 (a particle diameter of 20 μm), Example 4 (a particle diameter of 7 μm), and Comparative Example 1 (a particle diameter of 7 μm). As can be seen from FIG. 1, in both of Examples 3 and 4 according to the present embodiment, the resistance at a compression rate of 20% was in a range of 100Ω or lower. More specifically, in Example 3, the resistance at a compression rate of 3.4% was 80Ω, and in Example 4, the resistance at a compression rate of 8.2% was 97Ω. On the other hand, in Comparative Example 1 in which nickel/gold plating was performed on acryl resin powder, the resistance at a compression rate of 20% was 122Ω, and the resistance at a compression rate of about 23% was 100Ω. FIG. 2 shows a diagram that expresses the resistance (vertical axis) of FIG. 1 by logarithm. As can be seen from FIG. 2, the resistance at a compression rate of 50% in both of Examples 3 and 4 was in a range of 10Ω or lower. More specifically, in Example 3, the resistance at a compression rate of 25.9% was 10Ω. In Example 4, the resistance at a compression rate of 37.0% was 10Ω. On the other hand, in Comparative Example 1, the resistance at a compression rate of 50% was about 24Ω, and the resistance at a compression rate of 70% was about 21Ω. Table 1 shows the measurement results of the resistance during compression.

[Measurement of Powder Volume Resistance]

2.5 g of the silver-coated spherical resin was put into a mold having a diameter of 25 mm, and the powder volume resistance during pressurization was measured.

Regarding the silver-coated spherical resin in Example 3, the powder volume resistance at 9.8 MPa was in a range of $1.4 \times 10^3$ to $2.6 \times 10^{-3}$ Ω·cm, and the powder volume resistance at 49 MPa was in a range of $1.1 \times 10^{-3}$ to $2.4 \times 10^{-3}$ Ω·cm. Regarding the silver-coated spherical resin of Comparative Example 4, the powder volume resistance at 9.8 MPa was $5.2 \times 10^7$ Ω·cm, and the powder volume resistance at 49 MPa was $5 \times 10^7$ Ω·cm, which were very high values. In addition, after measurement, the plating was peeled off.

TABLE 1

| | Example | | | | | | | | | Comparative Example | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Average diameter of acryl resin (μm) | 35 | 30 | 20 | 7 | 3 | 1 | 1 | 3 | 7 | 7 | 3 | 3 | 30 |
| Variation coefficient of particle diameters of acryl resin (%) | 2.1 | 2.6 | 3.2 | 4.5 | 2.8 | 3.8 | 3.8 | 2.8 | 4.5 | 4.5 | 2.8 | 2.8 | 2.6 |
| Silver (mass %) | 2 | 10 | 20 | 35 | 50 | 80 | 80 | 50 | 35 | — | — | 50 | 10 |
| Nickel (mass %) | — | — | — | — | — | — | — | — | — | 26.7 | 36.0 | — | — |
| Gold (mass %) | — | — | — | — | — | — | — | — | — | 22.4 | 33.4 | — | — |
| Amount of coated metal with respect to 100 parts by mass of silver-coated spherical resin or conductive particles | 2 | 10 | 20 | 35 | 50 | 80 | 80 | 50 | 35 | 49.1 | 69.4 | 50 | 10 |
| Temperature of aqueous solution of tin compound in pretreatment (° C.) | 25 | 27 | 30 | 35 | 30 | 25 | 20 | 45 | 35 | — | — | 15 | 50 |
| Plating external appearance | A | A | A | A | A | A | A to B | A to B | A | A | A | B to C | C |
| Variation coefficient of particle diameters of silver-coated spherical resin or conductive particles (%) | 2.2 | 2.8 | 3.4 | 4.8 | 3.1 | 4.1 | 4.9 | 3.6 | 4.6 | 4.9 | 3.2 | 3.8 | 3.2 |
| Resistance at 10% of compression (Ω) | 91 | 85 | 34 | 70 | 432 | 40 | 87 | 1000 or higher | 64 | 403 | 1000 or higher | 1000 or higher | 1000 or higher |
| Resistance at 20% of compression (Ω) | 15 | 6 | 18 | 32 | 49 | 11 | 40 | 93 | 22 | 122 | 377 | 1000 or higher | 1000 or higher |
| Resistance at 50% of compression (Ω) | 4 | 2 | 2 | 2 | 3 | 5 | 7 | 8 | 1 | 24 | 94 | 821 | 1000 or higher |

[Evaluation of Crystallite Diameter of Silver of Silver-Coated Spherical Resin]

The crystallite diameter of silver was measured using an X-ray diffraction apparatus (product number: MiniFlex) manufactured by Rigaku Corporation. The crystallite diameters of the (111) crystal face, the (200) crystal face, and the (220) crystal face, and the (311) crystal face obtained by the Debye-Scherrer method of X-ray diffraction by CuKα radiation and the average value thereof were obtained. Table 2 shows the results.

TABLE 2

|  | Crystallite Diameter of Each Crystal Face | | | | Average Value |
| --- | --- | --- | --- | --- | --- |
|  | (111) | (200) | (220) | (311) |  |
| Example 1 | 19.8 | 17.4 | 19.0 | 18.0 | 18.6 |
| Example 2 | 21.0 | 22.8 | 19.9 | 19.7 | 20.9 |
| Example 3 | 21.0 | 19.2 | 21.0 | 19.7 | 20.2 |
| Example 4 | 23.8 | 20.3 | 22.2 | 19.7 | 21.5 |
| Example 5 | 23.8 | 24.3 | 23.5 | 20.6 | 23.1 |
| Example 6 | 23.8 | 21.5 | 22.2 | 19.7 | 21.8 |
| Example 7 | 22.4 | 20.2 | 19.0 | 19.7 | 20.3 |
| Example 8 | 22.4 | 19.2 | 20.0 | 18.0 | 19.9 |
| Example 9 | 15.5 | 22.8 | 23.5 | 19.7 | 20.4 |
| Comparative Example 3 | 20.1 | 16.4 | 18.0 | 16.8 | 17.8 |
| Comparative Example 4 | 21.0 | 12.6 | 17.4 | 14.0 | 16.3 |

As can be seen from Table 1, in all of Examples 1 to 9, the results showed that the surfaces were coated with the silver-plated layers (silver-coated layers), the variation coefficient of the particle diameters of the silver-coated spherical resin, and the resistance at a compression of 20% or 50% of the particle diameter were good. In Examples 2 to 5 in which the temperatures of the aqueous solutions of the tin compounds during the pretreatment were in a range of 27 to 35° C., the resistances at a compression of 50% of the particle diameter were in a range of 2 to 3 Ω·cm, which were very low. In Example 9 in which the temperature of the aqueous solution of the tin compound during the pretreatment was 35° C. and formalin and glucose were used as the reducing agent during electroless plating, the resistance at a compression of 50% of the particle diameter was 1 Ω·cm, which was significantly low. On the other hand, in Comparative Examples 1 and 2 in which nickel/gold plating was performed, the resistances at a compression of 20% of the particle diameter were 122 and 377 Ω·cm, respectively, which were very high, and the resistances at a compression of 50% of the particle diameter were 24 and 94 Ω·cm, respectively, which were also very high. In addition, in both of Comparative Example 3 in which the temperature of the aqueous solution of the tin compound during the pretreatment was low and Comparative Example 4 in which the temperature of the aqueous solution of the tin compound during the pretreatment was high, the particles were not properly coated with the silver-plated layers. In addition, the resistances at a compression of 20% of the particle diameter and the resistances at a compression of 50% of the particle diameter were high.

As can be seen from Table 2, the crystallite diameters of silver of Examples 1 to 9 were in a range of 18.6 to 23.1 nm, which were in the range described in the embodiment. In contrast, in Comparative Example 3 in which the temperature of the aqueous solution of the tin compound during the pretreatment was low and Comparative Example 4 in which the temperature of the aqueous solution of the tin compound during the pretreatment was high, the crystallite diameters of silver were 17.8 and 16.3 nm, respectively, both of which were low values. In addition, as can be seen from FIGS. 3 to 5, the silver-coated spherical resins of Examples 3, 4, and 8 were properly coated with silver. In Example 3 in which the temperature of the aqueous solution of the tin compound during the pretreatment was 30° C. and Example 4 in which the temperature of the aqueous solution of the tin compound during the pretreatment was 35° C., more dense silver-plated layers (silver-coated layers) were formed. In contrast, in Comparative Example 4 in which the temperature of the aqueous solution of the tin compound during the pretreatment was 50° C., many particles that were not coated with the silver-plated layers were observed.

INDUSTRIAL APPLICABILITY

The silver-coated spherical resin (the silver-coated spherical resin particles) of the present invention is coated with silver having crystallite diameters in the range described in the present embodiment, the external appearances of the particles are good, and the variation coefficient of the particle diameters is small. In addition, the resistance during compression in one direction is very low. Therefore, particularly, the silver-coated spherical resin of the present invention can be very appropriately applied as a conductive filler for an anisotropically conductive adhesive, an anisotropically conductive film, and a conductive spacer.

The method for producing the silver-coated spherical resin (the silver-coated spherical resin particles) of the present invention includes the process of performing the pretreatment on the spherical resin using the aqueous solution of the tin compound and the subsequent process of performing electroless silver plating thereon using the reducing agent, and the temperature of the aqueous solution of the tin compound during the pretreatment is set to be in a range of 20 to 45° C. Thereby, the silver-coated spherical resin of the present invention can be easily produced. Therefore, the method can be very appropriately applied to a process of producing a conductive filler for an anisotropically conductive adhesive, an anisotropically conductive film, and a conductive spacer.

The invention claimed is:

1. A silver-coated spherical resin comprising:
   a spherical resin consisting of an acryl-based resin;
   a tin adsorption layer provided on a surface of the spherical resin; and
   silver coated on a surface of the tin adsorption layer,
   wherein an amount of the silver is in a range of 2 to 80 parts by mass with respect to 100 parts by mass of the silver-coated spherical resin, and
   a crystallite diameter of the silver measured by X-ray diffractometry is in a range of 18 to 24 nm.

2. The silver-coated spherical resin according to claim 1, wherein an average particle diameter of the spherical resin is in a range of 0.5 to 40 pim, and a variation coefficient of particle diameters thereof is in a range of 5.0% or less.

3. The silver-coated spherical resin according to claim 1, wherein, when a single particle of the silver-coated spherical resin is compressed by 20% of the particle diameter thereof in one direction, a resistance in a compression direction thereof is in a range of 100Ω or lower.

4. The silver-coated spherical resin according to claim 1, wherein, when a single particle of the silver-coated spherical resin is compressed by 50% of the particle diameter thereof in one direction, a resistance in a compression direction thereof is in a range of 10Ω or lower.

5. A method for producing a silver-coated spherical resin comprising:
   a process of subjecting a spherical resin to a pretreatment using an aqueous solution of a tin compound; and a subsequent process of subjecting the spherical resin to an electroless silver
plating using a reducing agent,
wherein, during the pretreatment, a temperature of the aqueous solution of the tin compound is set to be in a range of 30 to 45° C.

6. The method for producing a silver-coated spherical resin according to claim 5,
wherein the reducing agent comprises formaldehyde.

7. The method for producing a silver-coated spherical resin according to claim 6,
wherein the reducing agent further comprises glucose.

8. An anisotropically conductive adhesive comprising:
the silver-coated spherical resin according to claim 1.

9. An anisotropically conductive film comprising:
the silver-coated spherical resin according to claim 1.

10. A conductive spacer comprising:
the silver-coated spherical resin according to claim 1.

* * * * *